US009084968B2

(12) United States Patent
Park

(10) Patent No.: US 9,084,968 B2
(45) Date of Patent: Jul. 21, 2015

(54) AFTER TREATMENT DEVICE OF ENGINE

(75) Inventor: Yun Sub Park, Incheon (KR)

(73) Assignee: Doosan Infracore Co., Ltd., Incheon (KR)

( * ) Notice: Subject to any disclaimer, the term of this patent is extended or adjusted under 35 U.S.C. 154(b) by 398 days.

(21) Appl. No.: 13/813,834

(22) PCT Filed: Jul. 21, 2011

(86) PCT No.: PCT/KR2011/005369
§ 371 (c)(1),
(2), (4) Date: Apr. 10, 2013

(87) PCT Pub. No.: WO2012/018186
PCT Pub. Date: Feb. 9, 2012

(65) Prior Publication Data
US 2013/0209317 A1 Aug. 15, 2013

(30) Foreign Application Priority Data
Aug. 2, 2010 (KR) .......................... 10-2010-0074675

(51) Int. Cl.
F01N 3/10 (2006.01)
F01N 3/18 (2006.01)
(Continued)

(52) U.S. Cl.
CPC ............ B01D 53/9477 (2013.01); F01N 3/208 (2013.01); F01N 2610/02 (2013.01); Y02T 10/24 (2013.01)

(58) Field of Classification Search
None
See application file for complete search history.

(56) References Cited

U.S. PATENT DOCUMENTS 5,121,734 A  6/1992 Grieshaber et al.
2005/0247051 A1* 11/2005 Wagner et al. .................. 60/287

FOREIGN PATENT DOCUMENTS

DE  102005015479 A1  10/2006
JP  H0814027 A  1/1996
(Continued)

OTHER PUBLICATIONS

Search Report dated Mar. 28, 2012 and written in Korean for International Application No. PCT/KR2011/005369, filed Jul. 21, 2011, 3 pages.

(Continued)

Primary Examiner — Walter D Griffin
Assistant Examiner — Jelitza Perez
(74) Attorney, Agent, or Firm — John D. Veldhuis-Kroeze; Westman, Champlin & Koehler, P.A.

(57) ABSTRACT

Disclosed is an after treatment device of an engine, which comprises: an urea solution injection section for injecting an urea solution to exhaust gas that is discharged from a combustion chamber of an engine to the outside via an exhaust pipe; a nitrogen oxide treatment section for converting a nitrogen oxide (NOx) in the exhaust gas, which is mixed with the urea solution injected from the urea solution injection section, into water (H2O) and nitrogen (N2); and an OC (Oxidation Catalyst) for reducing hydrocarbon (HC) and carbon monoxide (CO) in the exhaust gas that is discharged from the nitrogen oxide treatment section. The device is characterized by comprising an exhaust gas control unit, which supplies the exhaust gas that is discharged from the combustion chamber of the engine to the outside to a first treatment path and a second treatment path by distributing the same at a uniform rate according to the concentration level of the nitrogen oxide (NOx) in the exhaust gas that is discharged from the combustion chamber of the engine to the outside. The present disclosure is able to secure the efficiency and the durability of an SCR which converts harmful nitrogen oxide (NOx) into harmless water (H2O) and nitrogen (N2).

7 Claims, 1 Drawing Sheet

(51) Int. Cl.
B01D 53/94 (2006.01)
F01N 3/20 (2006.01)

(56) References Cited

FOREIGN PATENT DOCUMENTS

| JP | H08135434 A | 5/1996 |
|---|---|---|
| JP | H08144789 A | 6/1996 |
| JP | 2002-364353 A | 12/2002 |
| KR | 10-2003-0025193 A | 3/2003 |
| KR | 10-2010-0000535 A | 1/2010 |
| WO | 9103634 A1 | 3/1991 |

OTHER PUBLICATIONS

Chinese Office Action dated Jul. 25, 2014 for corresponding Chinese Application No. 2011800382246.2, 6 pages.

\* cited by examiner

AFTER TREATMENT DEVICE OF ENGINE

CROSS-REFERENCE TO RELATED APPLICATION

This application is a Section 371 National Stage Application of International Application No. PCT/KR2011/005369, filed Jul. 21, 2011 and published, not in English, as WO2012/018186 on Feb. 9, 2012.

FIELD OF THE DISCLOSURE

The present disclosure relates to an after treatment device of an engine, and more particularly, to an after treatment device of an engine, capable of efficiently treating harmful gas in exhaust gas by detecting concentration of nitrogen oxide (NOx) in the exhaust gas generated in a combustion process of mixture gas by the engine and distinguishing when an amount of emission of the nitrogen oxide is large and when an amount of emission of soot is larger than that of the nitrogen oxide.

BACKGROUND OF THE DISCLOSURE

In general, a diesel engine injects fuel such as diesel into a combustion chamber in a state in which air, which is supplied from the outside to the combustion chamber, is compressed at a high temperature and a high pressure, allows a piston to be moved up and down by an explosive force generated in combustion and explosion processes of mixture gas of air and fuel, and thus generates output power through a rotational force of a crankshaft that is connected to a connecting rod of the piston.

In the engine, fuel efficiency greatly varies according to a mixture ratio (for example, an air fuel ratio) of air and fuel that are supplied to the combustion chamber. When the air fuel ratio gets higher, the output power becomes better, but an amount of emission of nitrogen oxide (NOx), which is harmful to a human body and causes acid rain and photochemical smog as well as pollutes the atmosphere, increases. In contrast, when the air fuel ratio gets low, the output power deteriorates and emission of soot decreases.

Because of the above combustion properties of the engine, the recent diesel engine is adopting an after treatment method of an exhaust gas, which converts the nitrogen oxide (NOx), which is accompanied with the exhaust gas, into harmless water (H2O) and nitrogen (N2) by injecting a urea solution to an inlet portion side of an SCR (selective catalytic reduction), and allowing mixture gas of a urea solution and exhaust gas (or discharged gas) to pass through the SCR. In addition, when the mixture gas combusts, the diesel engine generates sulfur oxide or the like, which greatly disables the catalyst function of the SCR, as well as nitrogen oxide (NOx) and soot.

FIG. 1 is a schematic block diagram illustrating an after treatment device of an engine according to the related art.

As illustrated in FIG. 1, the after treatment device of an engine according to the related art is configured in a type including an exhaust pipe 2 of an engine 1, a urea solution injection section 3, a nitrogen oxide treatment section 4, and an OC (oxidation catalyst) 5.

Here, the urea solution injection section 3 is communicated with the exhaust pipe 2 of the engine 1 and serves to inject a urea solution to the exhaust gas in the exhaust pipe. Mixture gas of the exhaust gas and the urea solution is created while the urea solution and the exhaust gas are mixed with each other.

The nitrogen oxide treatment section 4 is disposed to be spaced apart from the urea solution injection section 3 while communicating with the exhaust pipe 2 of the engine 1 and the urea solution injection section 3, and serves to convert nitrogen oxide (NOx) in the mixture gas of the exhaust gas and the urea solution, which flows in through the urea solution injection section 3, into harmless water (H2O) and nitrogen (N2). The nitrogen oxide treatment section 4 includes an SCR 6 which converts the nitrogen oxide into harmless water and oxygen, and an AOC (ammonia oxidation catalyst) 7 which removes ammonia which slips as it is without reacting in the SCR 6.

The OC 5 is disposed to be spaced apart from the nitrogen oxide treatment section 4 while communicating with the nitrogen oxide treatment section 4 through the exhaust pipe 2, and serves to treat hydrocarbon (HC), carbon monoxide (CO) or the like.

As described above, in the engine 1, when the air fuel ratio gets high, the output power becomes better, but the amount of emission of nitrogen oxide (NOx) increases, and in the opposite case, the output power of the engine deteriorates and amounts of discharge of hydrocarbon (HC) and carbon monoxide (CO) increases.

That is, discharge gas of the nitrogen oxide (NOx) and discharge gas of the hydrocarbon (HC) and the carbon monoxide (CO) are in a trade-off relationship in which when a discharge amount of any one side is increased, a discharge amount of the other side is decreased. Nevertheless, the after treatment device of the engine according to the related art guides all of the exhaust gas, which is discharged from the engine to the outside, to the nitrogen oxide treatment section 4 to remove the nitrogen oxide (NOx) in the exhaust gas, as illustrated in FIG. 1, and guides the exhaust gas, which is discharged to the outside via the nitrogen oxide treatment section 4, to the OC 5 to remove the hydrocarbon (HC) and the carbon monoxide (CO) in the exhaust gas.

This uniform exhaust gas treatment path has a problem in that the sulfur oxide accompanied with the exhaust gas continuously weakens a function of a platinum (Pt) catalyst material which is coated on a plurality of guiding channels (not illustrated) of the SCR 6 of the nitrogen oxide treatment section 4. Moreover, when the hydrocarbon (HC) and the carbon monoxide (CO) also typically add a load to the platinum (Pt) catalyst material, there is a problem in that the nitrogen oxide treatment function of the SCR 6 greatly deteriorates, and as a result, efficiency and durability of the SCR 6 may not be secured.

The discussion above is merely provided for general background information and is not intended to be used as an aid in determining the scope of the claimed subject matter.

SUMMARY

This summary and the abstract are provided to introduce a selection of concepts in a simplified form that are further described below in the Detailed Description. The summary and the abstract are not intended to identify key features or essential features of the claimed subject matter, nor are they intended to be used as an aid in determining the scope of the claimed subject matter.

The present disclosure has been made in an effort to solve the aforementioned problem, and an object of the present disclosure is to provide an after treatment device of an engine, capable of securing efficiency and durability of an SCR (selective catalytic reduction) which converts harmful nitrogen oxide (NOx) into harmless water (H2O) and nitrogen (N2).

In order to achieve the aforementioned object, the present disclosure provides an after treatment device of an engine, which includes a urea solution injection section configured to inject a urea solution to exhaust gas, which is discharged from a combustion chamber of the engine to the outside through an exhaust pipe, a nitrogen oxide treatment section configured to convert nitrogen oxide (NOx) in the exhaust gas, which is mixed with the urea solution which is injected from the urea solution injection section, into harmless water (H2O) and nitrogen (N2), and an OC (oxidation catalyst) configured to reduce hydrocarbon (HC) and carbon monoxide (CO) in the exhaust gas which is discharged from the nitrogen oxide treatment section, the after treatment device including: a discharge gas control unit configured to distribute and supply the exhaust gas, which is discharged from the combustion chamber of the engine to the outside, to a first treatment path and a second treatment path at a uniform ratio in accordance with a concentration level of the nitrogen oxide (NOx) in the exhaust gas which is discharged from the combustion chamber of the engine to the outside.

In addition, the present disclosure further provides the following specific exemplary embodiments in addition to the above exemplary embodiment of the present disclosure.

According to an exemplary embodiment of the present disclosure, a ratio of the first treatment path to the second treatment path may be 100:0 or 0:100.

According to an exemplary embodiment of the present disclosure, the discharge gas control unit may include: a NOx detector provided at the outside of the engine and configured to detect concentration of the nitrogen oxide (NOx) in the exhaust gas, which is discharged from the combustion chamber of the engine to the outside, and generate an electrical signal; a controller configured to compare a signal value generated from the NOx detector with a data value stored in advance and determine an exhaust gas distribution ratio of the first treatment path and the second treatment path; and an adjusting valve provided at the exhaust pipe between the engine and the nitrogen oxide treatment section and configured to distribute and supply the exhaust gas, which is discharged from the combustion chamber of the engine to the outside, to the first treatment path and the second treatment path at a uniform ratio in accordance with a distribution ratio signal of the controller.

According to an exemplary embodiment of the present disclosure, the first treatment path may include the engine, the adjusting valve of the discharge gas control unit, the nitrogen oxide treatment section, and the OC, and the components may be connected by the exhaust pipe.

According to an exemplary embodiment of the present disclosure, the second treatment path may include the engine, the adjusting valve of the discharge gas control unit, and the OC, and the components may be connected by the exhaust pipe.

According to an exemplary embodiment of the present disclosure, the controller may be electrically connected to an actuator, which is provided at the urea solution injection section, and the controller may operate the actuator to stop an operation of the urea solution injection section when a flow path of the adjusting valve is opened to the OC, and may operate the actuator to restart the operation of the urea solution injection section when the flow path of the adjusting valve is opened to the nitrogen oxide treatment section.

According to an exemplary embodiment of the present disclosure, the controller may store operational amounts of the nitrogen oxide treatment section and the OC for every predetermined time according to a preset control program, and may interpolate data values of the operational amounts, which is stored in advance, of the nitrogen oxide treatment section and the OC to control the adjusting valve when the concentration of the nitrogen oxide (NOx) in the exhaust gas, which is discharged from the combustion chamber of the engine to the outside, remains at a preset level of a predetermined range of the nitrogen oxide.

The present disclosure provides the discharge gas control unit which guides the exhaust gas, which is discharged from the combustion chamber of the engine to the outside, to the first treatment path and the second treatment path at a predetermined distribution ratio in accordance with a concentration level of the nitrogen oxide (NOx) in the exhaust gas which is discharged from the combustion chamber of the engine to the outside, thereby securing efficiency and durability of an SCR which converts harmful nitrogen oxide (NOx) into harmless water (H2O) and nitrogen (N2).

DESCRIPTION OF MAIN REFERENCE NUMERALS OF DRAWINGS

Figure 1:
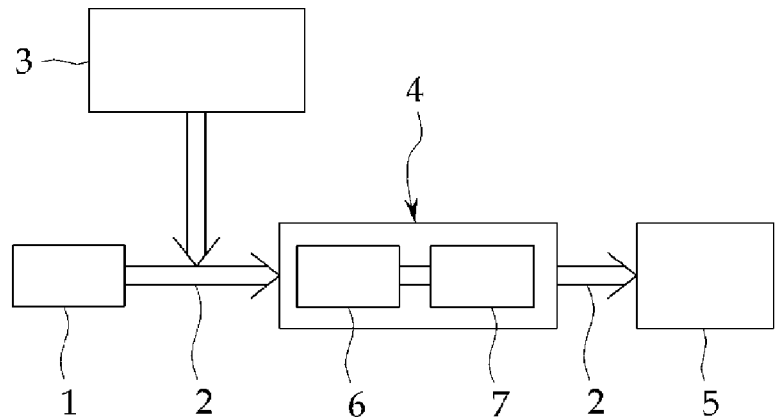
FIG. 1 is a schematic block diagram illustrating an after treatment device of an engine according to the related art.

1: Engine
2: Exhaust pipe
3: Urea solution injection section
4: Nitrogen oxide treatment section
5: OC
6: SCR
7: AOC
10: After treatment device of engine
15: First treatment path
16: Second treatment path
20: Discharge gas control unit
21: NOx detector
22: Controller
23: Adjusting valve

DETAILED DESCRIPTION

Hereinafter, an exemplary embodiment of an after treatment device of an engine according to the present disclosure will be described with reference to FIG. 2.

Figure 2:
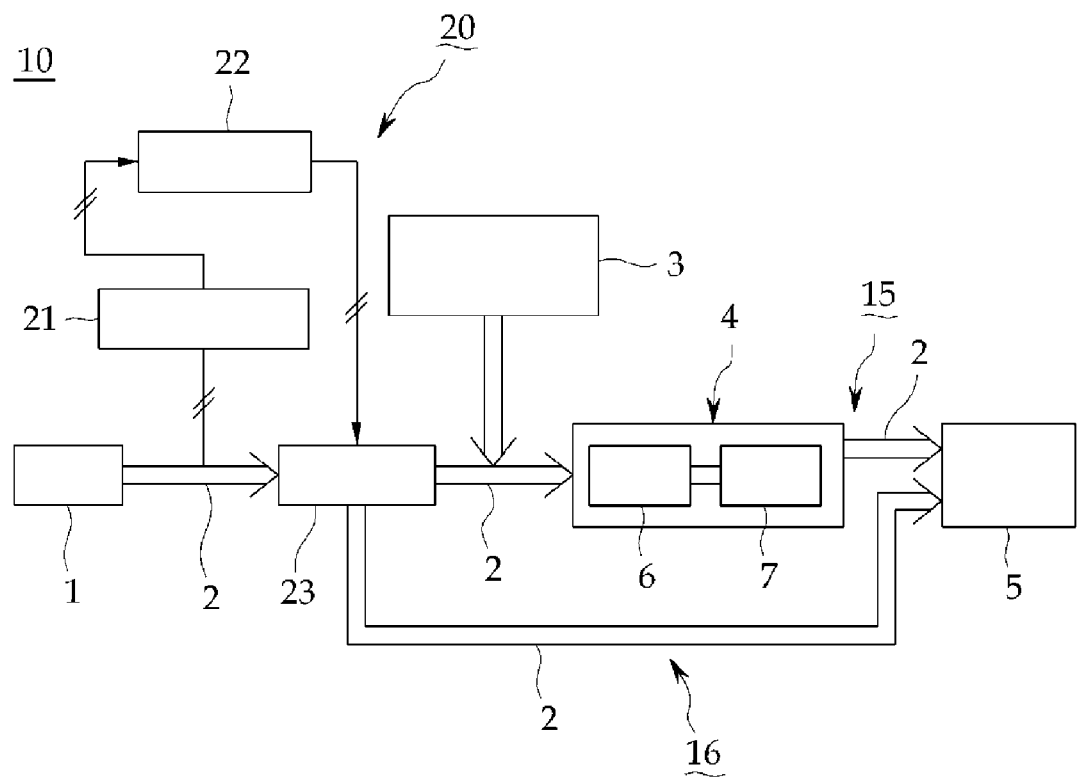
FIG. 2 is a schematic block diagram illustrating an after treatment device of an engine according to the present disclosure.

As illustrated in FIG. 2, an after treatment device 10 of an engine according to the present disclosure includes a urea solution injection section 3 which injects a urea solution to exhaust gas that is discharged from a combustion chamber of an engine 1 to the outside through an exhaust pipe 2, a nitrogen oxide treatment section 4 which converts nitrogen oxide (NOx) in the exhaust gas, which is mixed with the urea solution that is injected from the urea solution injection section 3, into harmless water (H2O) and nitrogen (N2), and an OC (oxidation catalyst) 5 which reduces hydrocarbon (HC) and carbon monoxide (CO) in the exhaust gas that is discharged from the nitrogen oxide treatment section 4. In addition, the after treatment device 10 of the engine includes a discharge gas control unit 20 which distributes and supplies the exhaust gas, which is discharged from the combustion chamber of the engine 1 to the outside, to a first treatment path 15 and a second treatment path 16 at a uniform ratio in accordance with a concentration level of the nitrogen oxide (NOx) in the exhaust gas that is discharged from the combustion chamber of the engine 1 to the outside.

Meanwhile, the nitrogen oxide treatment section 4 includes an SCR (selective catalytic reduction) 6 which converts the nitrogen oxide into harmless water and oxygen, and an AOC (ammonia oxidation catalyst) 7 which removes ammonia that slips as it is without reacting in the SCR 6.

The after treatment device 10 of the engine according to the present disclosure, which is configured as described above, is provided as a form including the first treatment path 15, the second treatment path 16, and the discharge gas control unit 20, and guides the exhaust gas, which is discharged from the combustion chamber of the engine 1 to the outside, to the first treatment path 15 and the second treatment path 16 at a predetermined distribution ratio through a control operation of the discharge gas control unit 20 in accordance with a concentration level of the nitrogen oxide (NOx) in the exhaust gas in order to process the exhaust gas.

Therefore, it is possible to solve a problem in that sulfur oxide in the exhaust gas continuously weakens a function of a platinum (Pt) catalyst material of the SCR 6 provided at the nitrogen oxide treatment section 4, and reduce a load that hydrocarbon (HC) and carbon monoxide (CO) in the exhaust gas typically applies to the platinum (Pt) catalyst material, thereby securing efficiency and durability of the nitrogen oxide treatment section 4 (for example, the SCR).

In addition, the after treatment device of the engine according to the present disclosure may be configured in a type which is limited to the following specific exemplary embodiments in addition to the aforementioned basic configuration.

As an exemplary embodiment, a ratio of the first treatment path 15 to the second treatment path 16 may be 100:0 or 0:100. This type of exhaust gas ratio distribution means that all of the exhaust gas is transmitted to any one of the first treatment path 15 and the second treatment path 16 while the other one is completely blocked.

As an exemplary embodiment, the discharge gas control unit 20 includes a NOx detector 21, a controller 22, and an adjusting valve 23.

Here, the NOx detector 21 is provided at the outside of the engine 1, and detects concentration of the nitrogen oxide (NOx) in the exhaust gas, which is discharged from the combustion chamber of the engine 1 to the outside, and generates an electrical signal.

The controller 22 compares a signal value generated from the NOx detector 21 with a data value stored in advance to determine an exhaust gas distribution ratio of the first treatment path 15 to the second treatment path 16. The controller 22 may be additionally installed, or an engine control unit (ECU), which is basically mounted at an electronic engine, may perform the function of the controller 22.

The adjusting valve 23 is provided at the exhaust pipe 2 between the engine 1 and the nitrogen oxide treatment section 4 and distributes and supplies the exhaust gas, which is discharged from the combustion chamber of the engine 1 to the outside, to the first treatment path 15 and the second treatment path 16 at a uniform ratio in accordance with a distribution ratio signal of the controller 22.

The discharge gas control unit 20 having the above structure is comparatively simply configured to have the NOx detector 21, the controller 22, and the adjusting valve 23, and provides an advantage of allowing the after treatment device 10 of the engine to be more compact. In addition, the controller 22 of the discharge gas control unit 20 allows the exhaust gas to be appropriately guided to any one of the first treatment path 15 and the second treatment path 16 or to both the treatment paths 15 and 16 by the adjusting valve 23 at a predetermined distribution ratio based on a determination result obtained through a comparative analysis that is performed by receiving an electrical signal transmitted from the NOx detector 21.

As an exemplary embodiment, the first treatment path 15 includes the engine 1, the adjusting valve 23 of the discharge gas control unit 20, the nitrogen oxide treatment section 4, and the OC 5, and the components are configured in a type connected by the exhaust pipe 2. The exhaust pipe 2 may be formed in any shape and formed of any material as long as the exhaust pipe 2 enables the components, which are adjacent to each other, to be communicated with each other, and may tolerate heat of the exhaust gas.

As an exemplary embodiment, the second treatment path 16 includes the engine 1, the adjusting valve 23 of the discharge gas control unit 20, and the OC 5, and the components are configured in a type connected by the exhaust pipe 2. The exhaust pipe 2 may be formed in any shape and formed of any material as long as the exhaust pipe 2 enables the components, which are adjacent to each other, to be communicated with each other, and may tolerate heat of the exhaust gas.

As an exemplary embodiment, the controller 22 is electrically connected to an actuator (not illustrated), which is provided at the urea solution injection section 3. In addition, the controller 22 operates the actuator to stop an operation of the urea solution injection section 3 when a flow path of the adjusting valve 23 is opened to the OC 5, and operates the actuator to restart the operation of the urea solution injection section 3 when the flow path of the adjusting valve 23 is opened to the nitrogen oxide treatment section 4. The actuator (not illustrated) may be additionally installed, but instead an actuator, which controls an injection nozzle provided at the urea solution injection section 3, may perform the function of the actuator. This enables the structure of the after treatment device of the engine to be a little more simple.

As an exemplary embodiment, the controller 22 performs a function of storing operational amounts of the nitrogen oxide treatment section 4 and the OC 5 for every predetermined time according to a preset control program. In addition, when concentration of the nitrogen oxide (NOx) in the exhaust gas, which is discharged from the combustion chamber of the engine 1 to the outside, remains at a preset level of a predetermined range of the nitrogen oxide, the controller 22 interpolates data values of the operational amounts, which is stored in advance, of the nitrogen oxide treatment section 4 and the OC 5 to control the adjusting valve 23. This may solve a problem in that the operational amounts of the nitrogen oxide treatment section 4 and the OC 5 are concentrated at any one side for a long period of time when the concentration of the nitrogen oxide (NOx) in the exhaust gas, which is discharged from the combustion chamber of the engine 1 to the outside, remains at the preset level of the predetermined range of the nitrogen oxide for a comparatively long period of time.

The following Table 1 represents distribution ratios of the exhaust gas, which is distributed to the first treatment path 15 and the second treatment path 16, respectively, for each concentration level of the nitrogen oxide (NOx).

TABLE 1

| NOx (ppm) | First treatment path (%) | Second treatment path (%) |
|---|---|---|
| above concentration level of predetermined range | 100 | 0 |

TABLE 1-continued

| NOx (ppm) | First treatment path (%) | Second treatment path (%) |
|---|---|---|
| concentration level of predetermined range (An) | Xn | Yn |
| below concentration level of predetermined range | 0 | 100 |

(An: NOx discharge amount, Xn + Yn (discharge amount of exhaust gas) = 100, n = 1 to 30)

An operation of the exemplary embodiment of the after treatment device of the engine, which is configured as described above, will be described with reference to FIG. 2.

When the exhaust gas is discharged from the combustion chamber of the engine 1 to the outside along the exhaust pipe 2 as the vehicle is started, the NOx detector 21 of the discharge gas control unit 20 detects concentration of the nitrogen oxide (NOx) in the exhaust gas and generates a corresponding electrical signal while distinguishing when the concentration exceeds a preset reference concentration level of the nitrogen oxide (NOx) and when the concentration is below the preset reference concentration level.

Then, when the controller 22 compares a signal value received from the NOx detector 21 with a data value, which is stored in advance, and determines that the concentration of the nitrogen oxide (NOx) in the exhaust gas exceeds the level of the predetermined range, the flow path of the adjusting valve 23 is opened to the nitrogen oxide treatment section 4.

Then, the exhaust gas is guided to the nitrogen oxide treatment section 4 through the adjusting valve 23, and at the same time, the controller 22 operates the injection nozzle of the urea solution injection section 3 to inject a urea solution to the exhaust gas in the exhaust pipe 2. Then, the urea solution is guided to the nitrogen oxide treatment section 4 together with the exhaust gas, the nitrogen oxide (NOx) in the exhaust gas is converted into harmless water (H2O) and nitrogen (N2) while passing through the nitrogen oxide treatment section 4, and the exhaust gas, which is purified, is discharged into the atmosphere. More specifically, in a treatment process of the exhaust gas using the nitrogen oxide treatment section 4, the nitrogen oxide (NOx) is converted into harmless water and oxygen by the SCR 6, the ammonia, which slips as it is without reacting in the SCR 6, is removed while passing through the AOC 7.

On the contrary, when it is determined that the concentration of the nitrogen oxide (NOx) in the exhaust gas is below the level of the predetermined range, the controller 22 opens the flow path of the adjusting valve 23 to the OC 5, and at the same time, stops the operation of the injection nozzle of the urea solution injection section 3 by controlling the actuator (not illustrated). Then, the exhaust gas is directly guided to the OC 5 through the adjusting valve 23, hydrocarbon (HC) and carbon monoxide (CO) in the exhaust gas are reduced by being oxidized while passing through the OC 5, and the exhaust gas, which is purified, is discharged into the atmosphere.

The present disclosure described above is not limited to the aforementioned exemplary embodiments and the accompanying drawings, and it is apparent to those skilled in the art that simple replacements, modifications and changes may be made thereto within the technical spirit of the present disclosure.

The after treatment device of the engine according to the present disclosure may be used to treat harmful gas in the exhaust gas by detecting the concentration of the nitrogen oxide (NOx) in the exhaust gas, which is generated in a combustion process of mixture gas by the engine, and distinguishing when an amount of emission of the nitrogen oxide is large and when an amount of emission of soot is larger than that of the nitrogen oxide.

Although the present disclosure has been described with reference to exemplary and preferred embodiments, workers skilled in the art will recognize that changes may be made in form and detail without departing from the spirit and scope of the disclosure.

The invention claimed is:

1. An after treatment device of an engine, which includes a urea solution injection section configured to inject a urea solution to exhaust gas, which is discharged from a combustion chamber of the engine to the outside through an exhaust pipe, a nitrogen oxide treatment section configured to convert nitrogen oxide (NOx) in the exhaust gas, which is mixed with the urea solution which is injected from the urea solution injection section, into harmless water ($H_2O$) and nitrogen ($N_2$), and an OC (oxidation catalyst) configured to reduce hydrocarbon (HC) and carbon monoxide (CO) in the exhaust gas which is discharged from the nitrogen oxide treatment section, the after treatment device comprising:
a discharge gas control unit configured to distribute and supply the exhaust gas, which is discharged from the combustion chamber of the engine to the outside, to a first treatment path and a second treatment path at a uniform ratio in accordance with a concentration level of the nitrogen oxide (NOx) in the exhaust gas which is discharged from the combustion chamber of the engine to the outside.

2. The after treatment device of claim 1, wherein a ratio of the first treatment path to the second treatment path is 100:0 or 0:100.

3. The after treatment device of claim 1, wherein the discharge gas control unit comprises:
a NOx detector provided at the outside of the engine and configured to detect concentration of the nitrogen oxide (NOx) in the exhaust gas, which is discharged from the combustion chamber of the engine to the outside, and generate an electrical signal;
a controller configured to compare a signal value generated from the NOx detector with a data value stored in advance and determine an exhaust gas distribution ratio of the first treatment path and the second treatment path; and
an adjusting valve provided at the exhaust pipe between the engine and the nitrogen oxide treatment section and configured to distribute and supply the exhaust gas, which is discharged from the combustion chamber of the engine to the outside, to the first treatment path and the second treatment path at a uniform ratio in accordance with a distribution ratio signal of the controller.

4. The after treatment device of claim 1, wherein the first treatment path comprises the engine, the adjusting valve of the discharge gas control unit, the nitrogen oxide treatment section, and the OC, and the components are connected by the exhaust pipe.

5. The after treatment device of claim 1, wherein the second treatment path comprises the engine, the adjusting valve of the discharge gas control unit, and the OC, and the components are connected by the exhaust pipe.

6. The after treatment device of claim 3, wherein the controller is electrically connected to an actuator, which is provided at the urea solution injection section. and the controller operates the actuator to stop an operation of the urea solution injection section when a flow path of the adjusting valve opened to the OC, and operates the actuator to restart the operation of the urea solution injection section when the flow path of the adjusting valve opened to the nitrogen oxide treatment section.

7. The after treatment device of claim 3, wherein the controller stores operational amounts of the nitrogen oxide treatment section and the OC for every predetermined time according to a preset control program, and interpolates data values of the operational amounts, which is stored in advance, of the nitrogen oxide treatment section and the OC to control the adjusting valve when the concentration of the nitrogen oxide (NOx) in the exhaust gas, which is discharged from the combustion chamber of the engine to the outside, remains at a preset level of a predetermined range of the nitrogen oxide.

* * * * *